(12) United States Patent
Romandy (10) Patent No.: US 9,474,413 B2
(45) Date of Patent: Oct. 25, 2016

(54) KITCHEN APPLIANCE WITH AN IMPROVED TEMPERATURE PROBE JACK RECEIVER COVER

(71) Applicant: Hamilton Beach Brands, Inc., Glen Allen, VA (US)

(72) Inventor: Mark K Romandy, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 77 days.

(21) Appl. No.: 14/640,350

(22) Filed: Mar. 6, 2015

(65) Prior Publication Data

US 2016/0255997 A1 Sep. 8, 2016

(51) Int. Cl.
*A47J 27/62* (2006.01)
*A47J 37/06* (2006.01)
*H01R 13/73* (2006.01)
*G01K 13/00* (2006.01)

(52) U.S. Cl.
CPC ............ *A47J 37/0629* (2013.01); *G01K 13/00* (2013.01); *H01R 13/73* (2013.01)

(58) Field of Classification Search
CPC .............................. A47J 37/0611; A47J 27/62
USPC .......................... 99/325, 331, 342, 451, 421;
219/10.55 B, 10.55 E, 10.55 F, 10.55 R,
219/712, 710, 704, 494, 412, 414, 413, 213,
219/506, 497, 202–205, 499, 501, 483, 507,
219/508
See application file for complete search history.

(56) References Cited

U.S. PATENT DOCUMENTS

| | | | |
|---|---|---|---|
| 4,140,048 A | 2/1979 | Grove et al. | |
| 4,345,145 A | 8/1982 | Norwood | |
| 4,849,595 A | 7/1989 | Fowler | |
| 4,851,644 A | 7/1989 | Oslin | |
| 4,967,049 A * | 10/1990 | Kaneshiro | G01K 1/00 219/712 |
| 5,694,831 A | 12/1997 | Haroun et al. | |
| 6,097,016 A | 8/2000 | Hirata et al. | |
| 6,111,240 A | 8/2000 | Kishimoto et al. | |
| 6,486,453 B1 | 11/2002 | Bales et al. | |
| 6,621,053 B1 | 9/2003 | Wen Sink et al. | |
| 6,933,477 B2 | 8/2005 | Becker et al. | |
| 7,171,727 B2 | 2/2007 | Wylie et al. | |
| 7,408,132 B2 * | 8/2008 | Wambsganss | H02H 5/042 219/202 |
| 7,481,153 B2 | 1/2009 | Barnes et al. | |
| D587,959 S | 3/2009 | Hensel | |
| 7,605,349 B2 * | 10/2009 | Gaynor | A47J 27/004 165/47 |
| 7,619,186 B2 | 11/2009 | Cavada et al. | |
| 8,136,442 B2 | 3/2012 | Strutin-Belinoff et al. | |

(Continued)

*Primary Examiner* — Phuong Nguyen
(74) *Attorney, Agent, or Firm* — Alexander D. Raring (57) ABSTRACT

A jack receiver for a kitchen cooking appliance includes a bracket mounted to the appliance. The bracket includes an aperture for receiving a thermometer therethrough. A jack socket for receiving and engaging a portion of the thermometer therein projects from the bracket aperture to an opposing side of the chamber's wall from the jack receiver, and is in operative communication with the appliance's controller. A cover is pivotably attached to the bracket and a biasing member exerts a biasing force onto the cover to bias the cover into a position covering the bracket aperture. The cover is pivotable against the biasing force of the biasing member, uncovering the bracket aperture, for insertion of the thermometer. Removal of the thermometer from the jack receiver permits automatic pivotable return of the cover to the covering position under the biasing force of the biasing member.

11 Claims, 5 Drawing Sheets

(56) References Cited

U.S. PATENT DOCUMENTS

| | | |
|---|---|---|
| D658,439 S | 5/2012 | Curtis et al. |
| D662,759 S | 7/2012 | Blacken et al. |
| D663,156 S | 7/2012 | Curtis et al. |
| D668,505 S | 10/2012 | Shrader et al. |
| 8,669,500 B2 | 3/2014 | Hensel et al. |
| 2003/0116557 A1 | 6/2003 | Graff |
| 2007/0045284 A1 | 3/2007 | Balk et al. |
| 2012/0192851 A1 | 8/2012 | Hensel et al. |
| 2013/0291740 A1* | 11/2013 | Seitz .................. A47J 27/16 99/342 |

* cited by examiner

KITCHEN APPLIANCE WITH AN IMPROVED TEMPERATURE PROBE JACK RECEIVER COVER

BACKGROUND OF THE DISCLOSURE

The present disclosure is generally directed to a kitchen cooking appliance having a jack receiver for receiving a temperature probe for controlling the heating and cooking of food in the cooking appliance.

Kitchen appliances for heating or cooking food therein, such as, for example, toaster ovens, ovens, range ovens, slow cookers, grills, and the like, may include a thermometer for measuring the temperature of food being heated or cooked therein for precise temperature and cooking control. Such a thermometer may be integrally attached to the appliance or selectively engageable with a jack receiver to establish communication with a controller of the kitchen appliance. The thermometer may be removable because the thermometer is not necessary for heating or cooking of some foods, such as, for example, pizza, soups, or toast.

The jack receiver may have a cover to prevent the internal components of the jack receiver from becoming contaminated during cooking, especially when the thermometer is not being used. Some manufacturers have utilized a flip cover that a user manually flips up, generally with his hand, to insert the thermometer into the jack receiver, and thereafter manually flips down in the reverse manner, after the thermometer is withdrawn from the jack receiver, to re-cover the jack receiver.

One drawback of such covers is that the cover may be hot, e.g., after heating or cooking, and therefore, a user may inadvertently burn his hand when flipping the cover down after withdrawing the thermometer from the jack receiver. The user may also accidentally contact other hot surfaces or the foodstuff that is being heated. Moreover, the user has to remember to return the jack cover to the closed position.

Therefore, it would be advantageous to provide an improved temperature probe jack receiver for a kitchen appliance, having a cover that permits insertion of a thermometer jack without opening the cover by hand and/or that automatically returns to a covering position after a user withdraws the thermometer from the jack receiver, without any additional user intervention.

BRIEF SUMMARY OF THE DISCLOSURE

Briefly stated, one aspect of the present disclosure is directed to a kitchen appliance comprising a housing having a heating chamber defined by at least a plurality of walls for heating or cooking foodstuff therein. At least one heating element is in thermal communication with the heating chamber. A controller is in operative communication with the at least one heating element. A jack receiver is mounted to the appliance such as to a wall inside of the heating chamber, and it is in operative communication with the controller. A thermometer, having a temperature probe for engaging the foodstuff and a thermometer jack, is removably insertable into the jack receiver for establishing communication between the thermometer probe and the controller.

The jack receiver comprises a bracket engaging the wall, having an aperture for receiving the thermometer jack therethrough, and a jack socket for receiving and engaging at least a portion of the thermometer jack therein. The jack socket projects from the bracket aperture to an opposing side of the wall from the jack receiver and is in operative communication with the controller. A cover member is pivotably attached to the bracket and a biasing member exerts a biasing force onto the cover member to bias the cover member into a first position covering the bracket aperture. The cover member is pivotable against the biasing force of the biasing member away from the first position, uncovering the bracket aperture, for insertion of the thermometer jack through the bracket aperture and into engagement with the jack socket. Removal of the thermometer jack from the jack receiver permits automatic pivotable return of the cover member to the first position under the biasing force of the biasing member.

Another aspect of the present disclosure is directed to a kitchen appliance comprising a housing having a heating chamber defined by at least a plurality of walls, for heating or cooking foodstuff therein. At least one heating element is in thermal communication with the heating chamber. A controller is in operative communication with the at least one heating element. A jack receiver is mounted to a wall inside of the heating chamber, in operative communication with the controller. A thermometer, having a temperature probe for engaging the foodstuff and a thermometer jack, is removably insertable into the jack receiver, for establishing communication between the thermometer probe and the controller.

The jack receiver comprises a bracket engaging the wall, having an aperture for receiving the thermometer jack therethrough, and a jack socket for receiving and engaging at least a portion of the thermometer jack therein. The jack socket projects from the bracket aperture to an opposing side of the wall from the jack receiver and is in operative communication with the controller. A torsion spring engages the bracket of the jack receiver at one end thereof and engages the cover member at an opposing end thereof, and exerts a biasing force onto the cover member to bias the cover member into a first position covering the bracket aperture.

The cover member is pivotable against the biasing force of the torsion spring away from the first position, uncovering the bracket aperture, for insertion of the thermometer jack through the bracket aperture and into engagement with the jack socket. The cover member also includes a caming indent in a side surface thereof. The thermometer jack engages the caming indent to pivot the cover member away from the first position. Removal of the thermometer jack from the jack receiver permits automatic pivotable return of the cover member to the first position under the biasing force of the torsion spring.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings a preferred embodiment of an improved temperature probe jack receiver cover for a kitchen appliance. It should be understood, however, that the disclosure is not limited to the precise arrangements and instrumentalities shown. In the drawings.

DESCRIPTION OF THE DISCLOSURE

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the kitchen appliance or the jack receiver, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally the same or similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
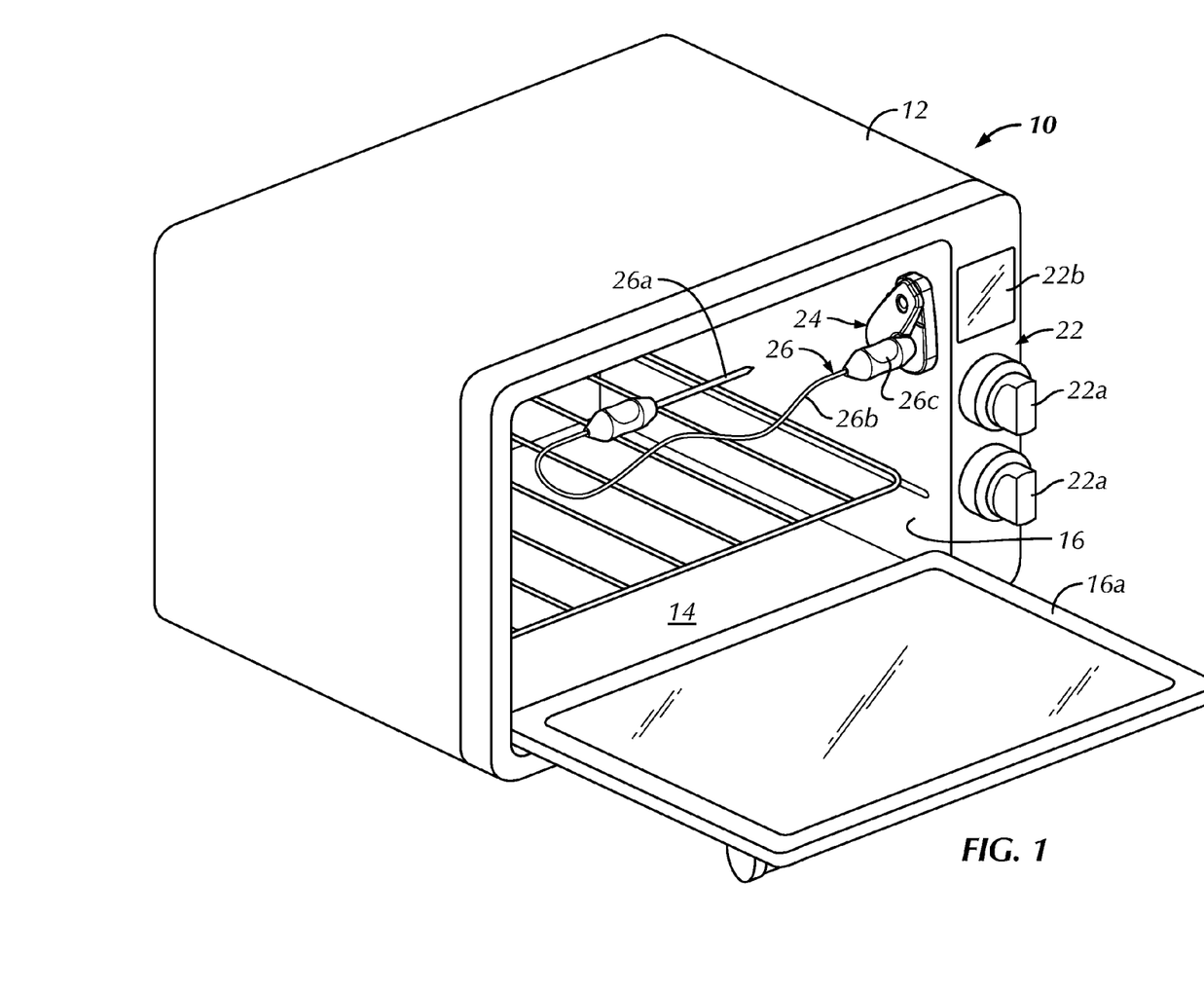
FIG. 1 is a perspective side view of the interior a kitchen appliance having a temperature probe jack receiver with a thermometer jack inserted therein in accordance with a preferred embodiment of the disclosure.

Referring to the drawings in detail, wherein like numerals indicate like elements throughout, there is shown in FIG. 1 the interior of a representative kitchen appliance, generally designated 10, with which a preferred embodiment of the present disclosure may be used. In the illustrated embodiment, the kitchen appliance 10 is a toaster oven. However, as should be understood by those of ordinary skill in the art, the kitchen appliance 10 may be any kitchen appliance having a heating chamber for heating or cooking food or foodstuff (not shown) therein, such as, for example, without limitation, a range oven, a slow cooker, a grill or the like. As also should be understood by those of ordinary skill in the art, the term foodstuff includes meat, poultry, vegetables and any food that is heated or cooked for which the internal temperature thereof is relevant to the desired heating or cooking thereof.

As shown in FIG. 1, the toaster oven 10 includes a housing 12 enclosing a heating chamber 14. The heating chamber 14 is defined by a plurality of walls 16, in a manner well understood by those of ordinary skill in the art, at least one of the walls 16 (door) being movable between open and closed positions for selective access to the interior of the heating chamber 14. For example, in the illustrated embodiment, one of the walls 16, i.e., the front door 16a, is pivotably attached to the housing 12 and is pivotable between open and closed positions for access to the interior of the heating chamber 14.

Figure 2:
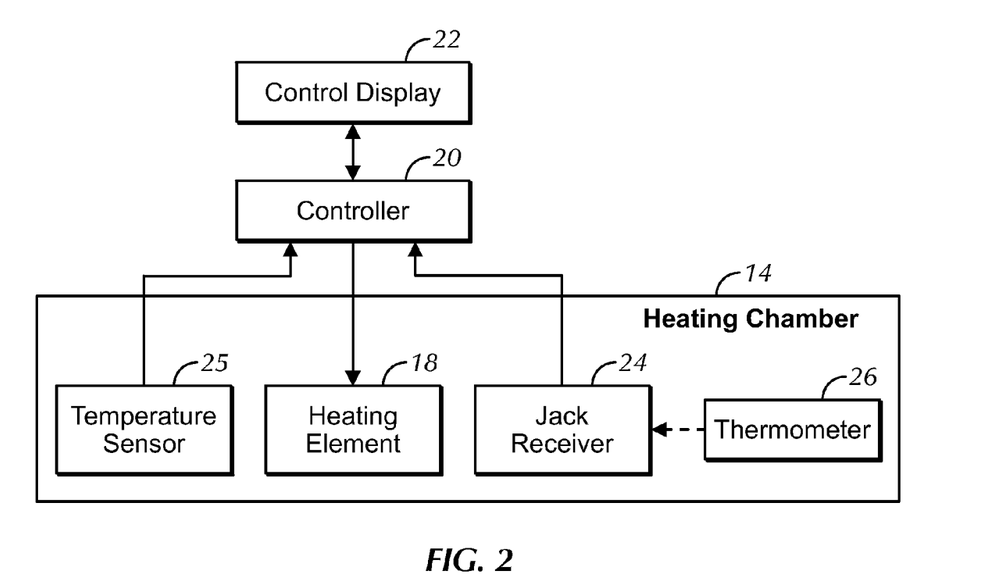
FIG. 2 is a schematic block diagram of the operational connectivity between operational components of the kitchen appliance of FIG. 1.

As shown schematically in FIG. 2, the toaster oven 10 includes at least one conventional heating element 18 inside of or at least in thermal communication with the heating chamber 14, for heating or cooking the foodstuff therein. The at least one heating element 18 is also in operative communication with a controller 20, in a manner well understood by those of ordinary skill in the art. As also should be understood by those of ordinary skill in the art, a conventional temperature sensor 25 is located within the heating chamber 14 and is also in operative communication with the controller 20, for providing feedback to the controller 20 regarding the temperature inside the heating chamber 14. A control display 22 (FIG. 1), also in operative communication with the controller 20 in a conventional manner, is mounted on an exterior surface of the housing 12 and includes a plurality of control buttons or nozzles 22a and/or displays 22b for selecting and displaying different heating or cooking settings.

As shown in FIG. 1, a jack receiver 24 can be mounted to one of the walls 16 inside the heating chamber 14. It is to be understood that the jack receiver could be located elsewhere on the appliance. The jack receiver 24 is in operative communication with the controller 20 (FIG. 2), in a manner well understood by those of ordinary skill in the art. As shown in FIG. 1, the jack receiver 24 is configured to receive and engage a thermometer 26. Engagement of the thermometer 26 with the jack receiver 24 establishes communication between the thermometer 26 and the controller 20, to provide feedback to the controller regarding the temperature of the foodstuff, as will be described in further detail below.

As also shown in FIG. 1, the thermometer includes a temperature probe 26a on one end for engaging the foodstuff inside the heating chamber 14, connected by a flexible electrical cord 26b to a thermometer jack 26c on the other end, removably insertable into the jack receiver 24, as will also be described in further detail below. The thermometer 26 is typical of thermometers known in the art.

Figure 3:
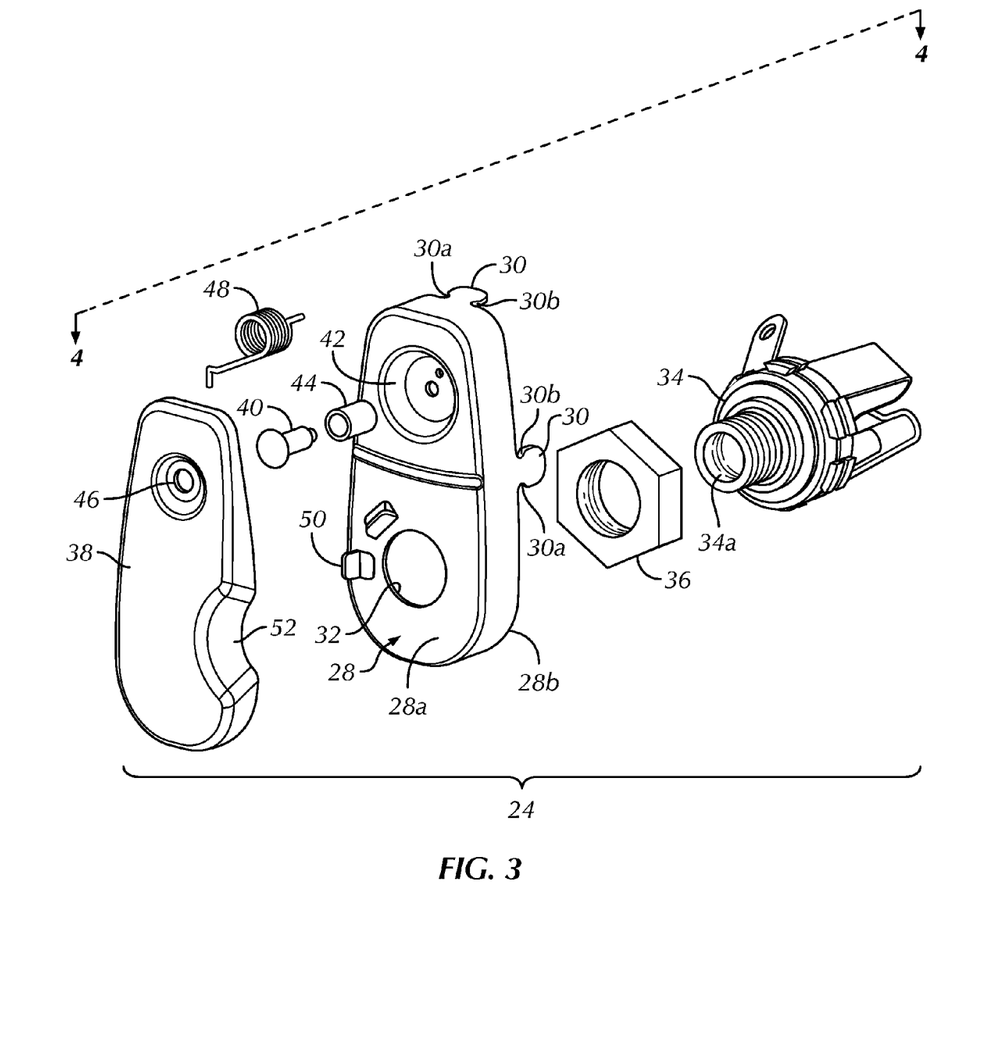
FIG. 3 is an exploded perspective view of the jack receiver of FIG. 1.
Figure 4:
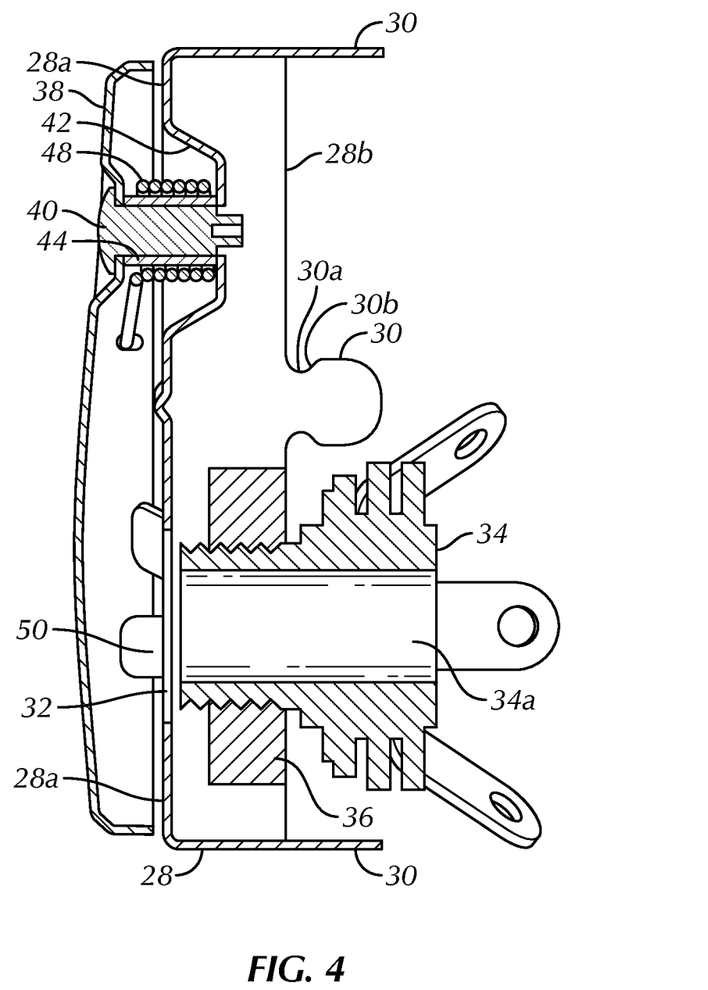
FIG. 4 is a cross-sectional perspective view of the jack receiver of FIG. 1, taken along sectional line 4-4 of FIG. 3.

As shown best in FIGS. 3 and 4, the jack receiver 24 includes a bracket 28 which engages and is secured to the wall 16 inside the heating chamber 14. In the illustrated embodiment, the bracket 28 includes a top surface 28a, facing the interior of the heating chamber 14 when the jack receiver 24 is mounted to the wall 16, and an opposing open rear end 28b. In the illustrated embodiment, a plurality of engaging tabs 30, projecting rearwardly from the rear end 28b of the bracket 28, extend through a corresponding plurality of apertures (not shown) in the wall 16 of the heating chamber 14, for orienting and mounting the jack receiver 24 onto the wall 16.

As shown, each engaging tab 30 defines a neck portion 30a, proximate the rear end 28b of the bracket 28. The neck portion 30a defines a bordering shoulder 30b, for creating a snap connection between the bracket 28 and the wall 16 of the heating chamber 14 when the engaging tabs 30 are advanced through the corresponding apertures in the wall 16. However, as should be understood by those of ordinary skill in the art, the bracket 28 may be permanently or releasably secured to the wall 16 of the heating chamber 14 via many different types of connections currently known, or that later become known.

The bracket 28 further includes a bracket aperture 32 in the top surface 28a thereof sized and shaped to receive the thermometer jack 26c therethrough. The bracket aperture 32 defines an insertion axis through the center point thereof. The thermometer jack 26c is insertable into a jack socket 34 along the insertion axis. The jack socket 34 projects from the bracket aperture 32 to an opposing side of the wall 16 and is in operative communication with the controller 20 in a manner well understood by those of ordinary skill in the art. As shown in FIG. 4, the jack socket 34 includes an internal channel 34a for receiving and engaging at least a portion of the thermometer jack 26c, thereby establishing operative communication between the thermometer jack 26c, and thus, the thermometer probe 26a and the controller 20.

In the illustrated embodiment, as shown in FIGS. 3 and 4, a fastening nut 36 is securely engaged with the bracket 28, in axial alignment with the bracket aperture 32. For example, without limitation, the fastening nut 36 may be welded or otherwise securely engaged with the interior side of the top surface 28a of the bracket 28. The jack socket 34 is threadedly engaged with fastening nut 36 (FIG. 4), to project from the bracket aperture 32. However, as should be understood by the those of ordinary skill in the art, the jack socket 34 may be coupled with the bracket 28 via any of numerous different attachment means currently known, or that later become known, such as, for example, via direct engagement with the bracket 28.

Figure 6:
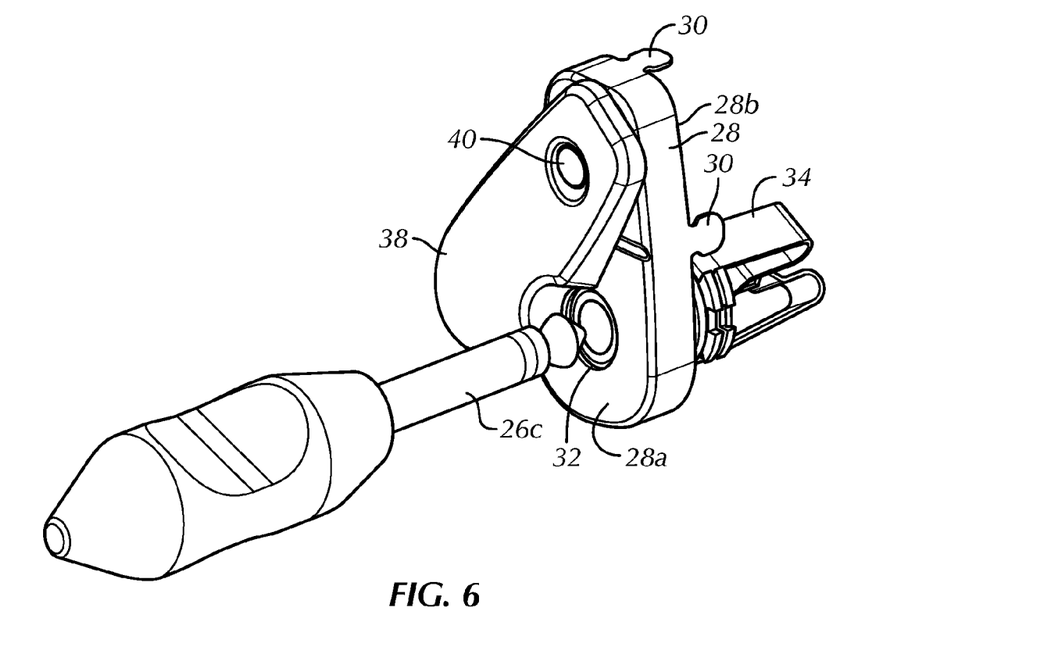
FIG. 6 is a front and side perspective view of the jack receiver of FIG. 1, with a thermometer jack pivoting the cover member away from the first position thereof.
Figure 7:
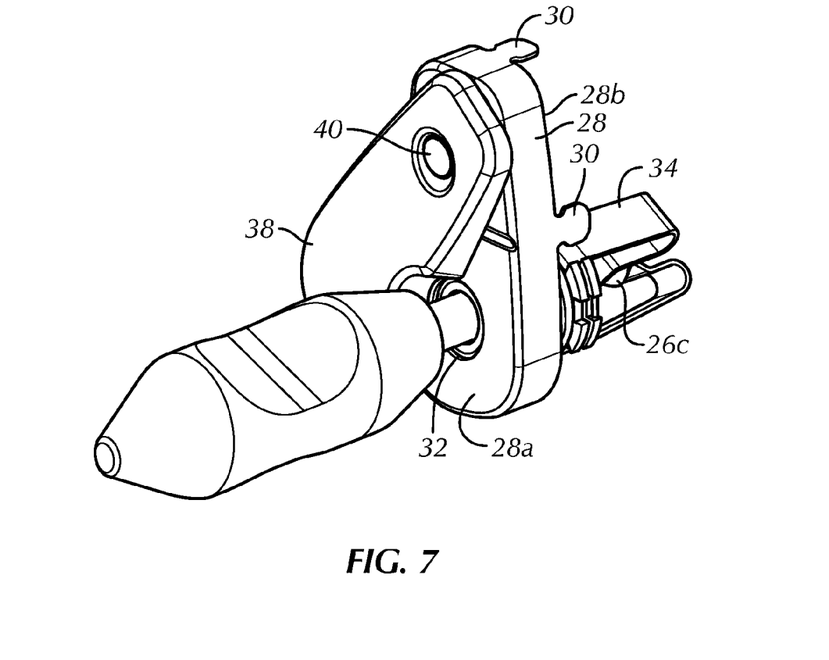
FIG. 7 is a front and side perspective view of the jack receiver of FIG. 1, with a thermometer jack inserted into the jack receiver.

As shown, the jack receiver 24 further includes a cover member 38 pivotably attached to the bracket 28. In the illustrated embodiment, the cover member 38 is pivotably attached to the bracket 28 via a rivet 40 or another suitable pivot connection. The top surface 28a of the bracket 28 includes a generally conical indent 42 therein, projecting toward the rear end 28b of the bracket 28. A hollow, generally cylindrical spacer 44 projects from the indent 42 toward the cover member 38. The cover member 38 includes an aperture 46, axially aligned with the indent 42 of the bracket 28, such that the rivet 40 extends through the aperture 46 of the cover member 38 and into the hollow spacer 44, creating a pivotable attachment between the cover member 38 and the bracket 28. Aperture 46 defines a cover rotation axis that is parallel to the insertion axis defined by bracket aperture 32. As shown in FIGS. 1, 6 and 7 the cover member 38 is pivotable in a plane parallel to a plane defined by the top surface 28a of the bracket 28. Cover member 38 rotates on and about the cover rotation axis that passes through the center point of aperture 46.

The jack receiver 24 also includes a biasing member 48 engaged with both the cover member 38 and the bracket 28. In the illustrated embodiment, as shown in FIGS. 3 and 4, the biasing member is a torsion spring 48 surrounding a portion of the spacer 44, and engaged at one end with the bracket 28, and at an opposing end thereof with the cover member 38. However, as should be understood by those of ordinary skill in the art, the biasing member 48 may alternatively take the form of other biasing members, currently known, or that later become known, capable of performing the function of the torsion spring 48 described herein.

The torsion spring 48 is twistable and stores a biasing force when twisted, proportional to the amount, i.e., angle, of twist. Thus, when the cover member 38 is pivoted, thereby twisting the torsion spring 48, the biasing force stored in the torsion spring 48 is exerted as a torque in the opposite direction onto the cover member 38. Accordingly, the torsion spring 48 biases the cover member into a first position (FIG. 5), covering the bracket aperture 32. The cover member 38 is manually pivotable away from the first position (FIGS. 1, 6 and 7), against the stored biasing force of the torsion spring 48, to uncover the bracket aperture 32 for insertion of the thermometer jack 26c through the bracket aperture 32 and into engagement with the jack socket 34. At least one stop tab 50 projects from the top surface 28a of the bracket 28 and is covered by the cover member 38, to limit the angular range of pivotable motion of the cover member 38 away from the first position, to protect from inadvertently damaging the torsion spring 48. Upon removal of the thermometer jack 26c from the jack receiver 34, the biasing force of the torsion spring 48 permits automatic pivotable return of the cover member 38 to the first position.

As shown, the cover member 38 further includes a caming indent 52 in a side surface thereof, i.e., a surface extending generally perpendicularly to the top surface 28a of the bracket 28. In the illustrated embodiment, the caming indent 52 is a generally arcuate indent corresponding to the generally cylindrical shape of the thermometer jack 26c. However, as should be understood by those of ordinary skill in the art, the caming indent 52 is not limited to a generally arcuate indent, and may alternatively take the form of other shapes and sizes. As will be described further below, a user may engage the caming indent 52 with the thermometer jack 26c to manually pivot the cover member 38 away from the first position (FIG. 5), to access the bracket aperture 32 for insertion of the thermometer jack 26 into the jack receiver 34 (FIGS. 1, 7).

In use, a user may wish to monitor the internal temperature of the foodstuff in the heating chamber 14, during heating or cooking thereof, in addition to monitoring the internal temperature of the heating chamber 14 via the temperature sensor 25. Accordingly, the user inserts the temperature probe 26a into the foodstuff (not shown). As shown in FIG. 6, the user also engages the earning indent 52 of the cover member 38 of the jack receiver 24 with the thermometer jack 26c to pivot the cover member 38 against the biasing force of the torsion spring 48 (clockwise pivoting in the illustrated embodiment) to uncover the bracket aperture 32. Once the cover member 38 is adequately pivoted to clear the bracket aperture 32 (FIG. 6), the user inserts the thermometer jack 26c through the bracket aperture 32 and into engagement with the jack receiver 34 (FIG. 7) to establish operative communication between the temperature probe 26a and the controller 20. As shown in FIG. 7, the biasing force of the torsion spring 48 causes the cover member 38 to rest against the thermometer jack 26c. That is, the cover member 28 is prevented from returning to the first position only by the presence of the thermometer jack 26c in the jack socket 34.

The temperature probe 26a transmits foodstuff temperatures to the controller 20 for controlling the heating or cooking of the foodstuff. For example, the controller 20 may utilize the foodstuff temperature transmitted thereto from the temperature probe 26a to determine the necessary heating or cooking temperature for the foodstuff, the necessary heating or cooking time, or to determine whether the foodstuff is sufficiently heated or cooked. The controller 20 activates and deactivates the heating element 18 accordingly.

Figure 5:
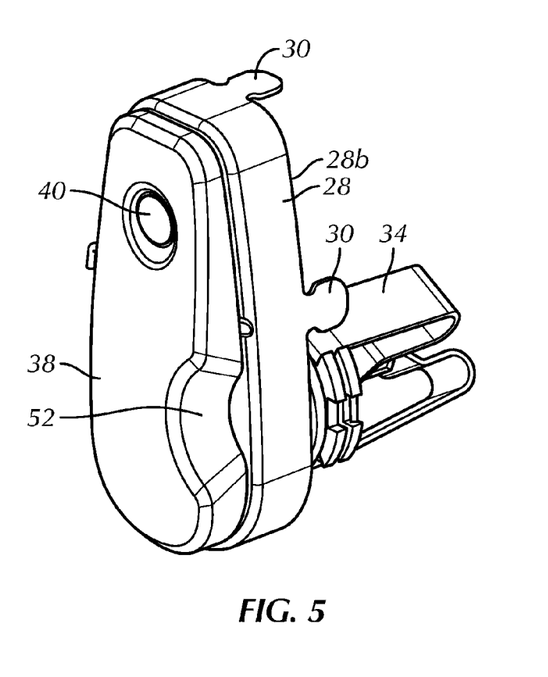
FIG. 5 is a front and side perspective view of the jack receiver of FIG. 1, in a first position of the cover member.

After the foodstuff has been heated or cooked, the user removes the temperature probe 26a from the foodstuff and removes the thermometer jack 26c from engagement with the jack receiver 24. Upon removal of the thermometer jack 26c, the torsion spring 48 automatically biases the cover member 38 to pivot back into the first position (FIG. 5). Therefore, the user advantageously is not required to manually touch and return the hot (from the temperature inside the heating chamber 14 during heating or cooking) cover member 38 to the first position.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

I claim:

1. A kitchen appliance comprising:
a housing having a heating chamber for heating or cooking foodstuff therein, the heating chamber being defined by at least a plurality of walls;
at least one heating element in thermal communication with the heating chamber;
a controller, in operative communication with the at least one heating element;
a jack receiver mounted to the appliance in operative communication with the controller;
a thermometer having a temperature probe for engaging the foodstuff and a thermometer jack removably insertable into the jack receiver, for establishing communication between the thermometer probe and the controller;
the jack receiver comprising:
a bracket engaging the wall and having an aperture for receiving the thermometer jack therethrough, the bracket having a top surface defining a plane;
a jack socket for receiving and engaging at least a portion of the thermometer jack therein, the jack socket projecting from the bracket aperture to an opposing side of the wall from the jack receiver, the jacket socket being in operative communication with the controller;
a cover member pivotably attached to the bracket, the cover member pivotable in a plane parallel to the plane defined by the top surface of the bracket; and
a biasing member exerting a biasing force onto the cover member to bias the cover member into a first position covering the bracket aperture;
wherein the cover member is pivotable against the biasing force of the biasing member away from the first position, uncovering the bracket aperture, for insertion of the thermometer jack through the bracket aperture and into engagement with the jack socket, and wherein removal of the thermometer jack from the jack receiver permits automatic pivotable return of the cover member to the first position under the biasing force of the biasing member.

2. The kitchen appliance of claim 1, wherein the cover member of the jack receiver includes a caming indent in a side surface thereof, said thermometer jack engaging the caming indent to pivot the cover member away from the first position.

3. The kitchen appliance of claim 2, wherein the caming indent is a generally arcuate indent corresponding to a cylindrical shape of the thermometer jack.

4. The kitchen appliance of claim 2, wherein the bracket top surface has the bracket aperture therein, the side surface of the cover member include the caming indent, and the caming indent extending generally perpendicularly to the top surface of the bracket.

5. The kitchen appliance of claim 1, wherein the biasing member comprises a torsion spring engaging the bracket of the jack receiver at one end thereof and engaging the cover member at an opposing end thereof.

6. The kitchen appliance of claim 1, wherein the bracket of the jack receiver further includes a stop tab projecting from the bracket and covered by the cover member, said stop tab limiting an angular range of pivotable motion of the cover member away from the first position.

7. A kitchen appliance comprising:
a housing having a heating chamber for heating or cooking foodstuff therein, the heating chamber being defined by at least a plurality of walls;
at least one heating element in thermal communication with the heating chamber;
a controller in operative communication with the at least one heating element;
a jack receiver mounted to a wall inside of the heating chamber, in operative communication with the controller;
a thermometer having a temperature probe, for engaging the foodstuff, and a thermometer jack removably insertable into the jack receiver, for establishing communication between the thermometer probe and the controller;
the jack receiver comprising:
a bracket engaging the wall and having an aperture for receiving the thermometer jack therethrough,
a jack socket for receiving and engaging at least a portion of the thermometer jack therein, the jack socket projecting from the bracket aperture to an opposing side of the wall from the jack receiver, the jacket socket being in operative communication with the controller;
a cover member pivotably attached to the bracket;
a torsion spring engaging the bracket of the jack receiver at one end thereof and engaging the cover member at an opposing end thereof, and exerting a biasing force onto the cover member to bias the cover member into a first position covering the bracket aperture;
the cover member pivotable against the biasing force of the torsion spring away from the first position, uncovering the bracket aperture, for insertion of the thermometer jack through the bracket aperture and into engagement with the jack socket;
the cover member including a caming indent in a side surface thereof, the thermometer jack engaging the caming indent to pivot the cover member away from the first position; and
removal of the thermometer jack from the jack receiver permits automatic pivotable return of the cover member to the first position under the biasing force of the torsion spring.

8. The kitchen appliance of claim 7, wherein the caming indent is a generally arcuate indent corresponding to a cylindrical shape of the thermometer jack.

9. The kitchen appliance of claim 7, wherein the bracket defines a top surface having the bracket aperture therein, the side surface of the cover member, having the caming indent, extending generally perpendicularly to the top surface of the bracket.

10. The kitchen appliance of claim 7, wherein the bracket defines a top surface having the bracket aperture therein, said top surface defining a plane, and wherein the cover member is pivotable in a plane parallel to the plane of the top surface of the bracket.

11. The kitchen appliance of claim 7, wherein the bracket of the jack receiver further includes a stop tab projecting from the bracket and covered by the cover member, said stop tab limiting an angular range of pivotable motion of the cover member away from the first position.

* * * * *